PORTABLE MEMORY FOR DATA PROCESSING MACHINE

Filed Dec. 11, 1961 2 Sheets-Sheet 1

*INVENTOR.*
ROBERT E. PATTISON
*BY* Robert B. Crouch
ATTORNEY

United States Patent Office 3,176,281
Patented Mar. 30, 1965

3,176,281
PORTABLE MEMORY FOR DATA PROCESSING MACHINE

Robert E. Pattison, San Jose, Calif., assignor to International Business Machines Corporation, New York, N.Y., a corporation of New York Filed Dec. 11, 1961, Ser. No. 158,384
8 Claims. (Cl. 340—174.1)

The present invention relates to a data storage device or memory for data processing machines and more particularly to a portable disk-type memory which incorporates protective meaans for effecting selective engagement and disengagement with a memory processing unit.

Commercially available disk-type magnetic data storage devices, or memories, have in the past included a substantial number of recording disks spaced slightly apart and arranged in a stack. Each stack of disks has been fixed to a proceeding unit for rotation relative to one or more magnetic transducers which are adapted to cooperate with the lateral surfaces of the disks. The magnetic transducers operate in very close proximity to the record surfaces and are movable radially on the disks to process information which is stored in concentric tracks on the disks. This arrangement has given rise to at least two requirements, i.e., the disk surfaces must be protected from dust and dirt particles which might interfere with the magnetic recording process and the transducers must be precisely positioned relative to the disks themselves for accurate location of the information tracks. To satisfy these requirements the large stack of disks required for each memory has been firmly fixed in rigidly supported journal bearings within a closed cabinet.

The object of the present invention is to provide a compact, portable disk-type memory which is readily securable, in precise alignment, on a fixed rotating drive member and which is protected for movement and storage when detached from the drive member.

The above object is realized in the present invention by the provision of a compact disk-type memory package which is detachable from a memory processing unit. The memory package includes means for achieving alignment with a memory drive means on the processing unit and a locking assembly from securing the memory package to either the drive means or to a removable dust cover which serves as a protective storage receptacle. The memory package contains means for releasing the locking connection between the memory package and the memory drive means. The locking connection between the dust cover and the memory package is automatically made or released when the locking connection between the memory package and the drive means is released or made, respectively.

The foregoing and other objects, features and advantages of the invention will be apparent from the following more particular description of a preferred embodiment of the invention, as illustrated in the accompanying drawings.

Figure 1:
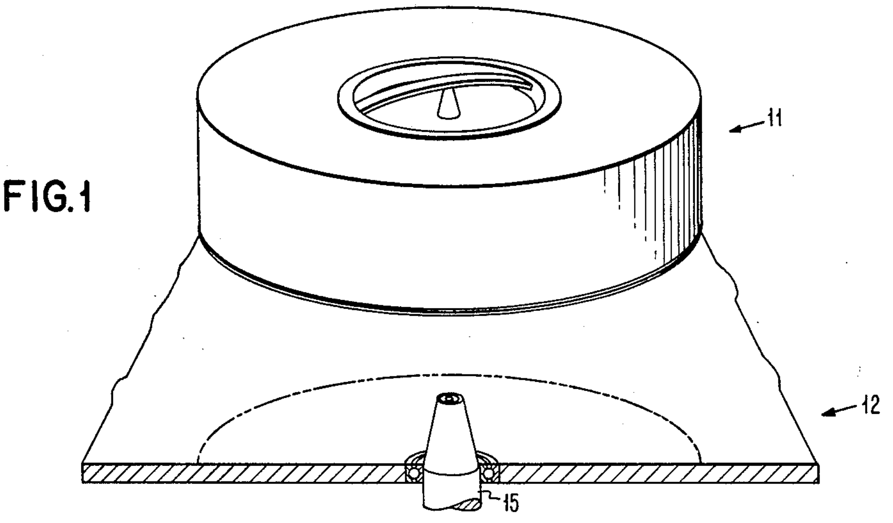
FIG. 1 is a perspective view of the memory package of the present invention detached from the memory processing unit.
Figures 2, 4:
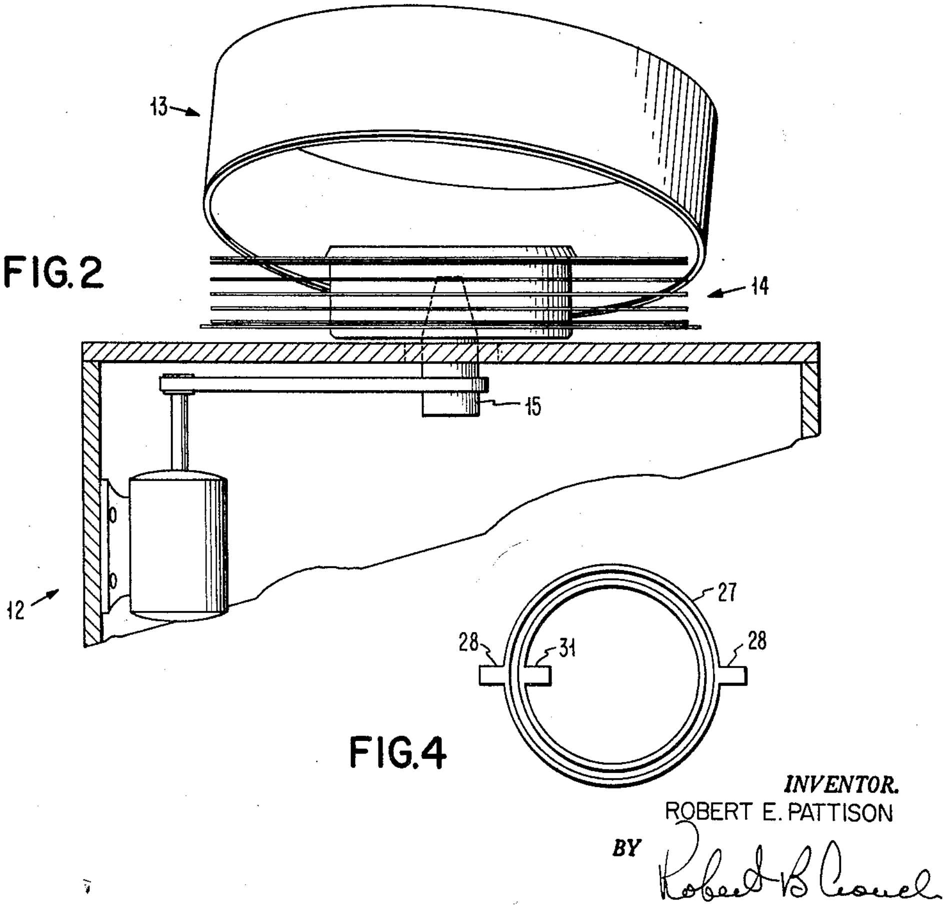
FIG. 2 is an elevation view of the memory package mounted on the processing unit with the cover removed.
FIG. 4 is a plan view illustrating the shape of the bearing race employed in the present invention.

Referring to FIGS. 1 and 2 the present invention is illustrated as a compact, portable memory package 11 adapted to be mounted on a processing unit 12. The memory package 11 includes a removable dust cover 13 and a disk pack 14 adapted to be secured to a memory drive means, in the form of a driven spindle 15 which is rotatably mounted within the processing unit 12. The memory package is so constructed that the disk pack cannot be removed from the spindle unless the dust cover is in place and the dust cover cannot be removed from the disk pack unless the disk pack is locked onto the spindle. These limitations have been designed into the memory package to ensure protection of the disk pack whenever it is removed from the processing unit.

Figure 3:
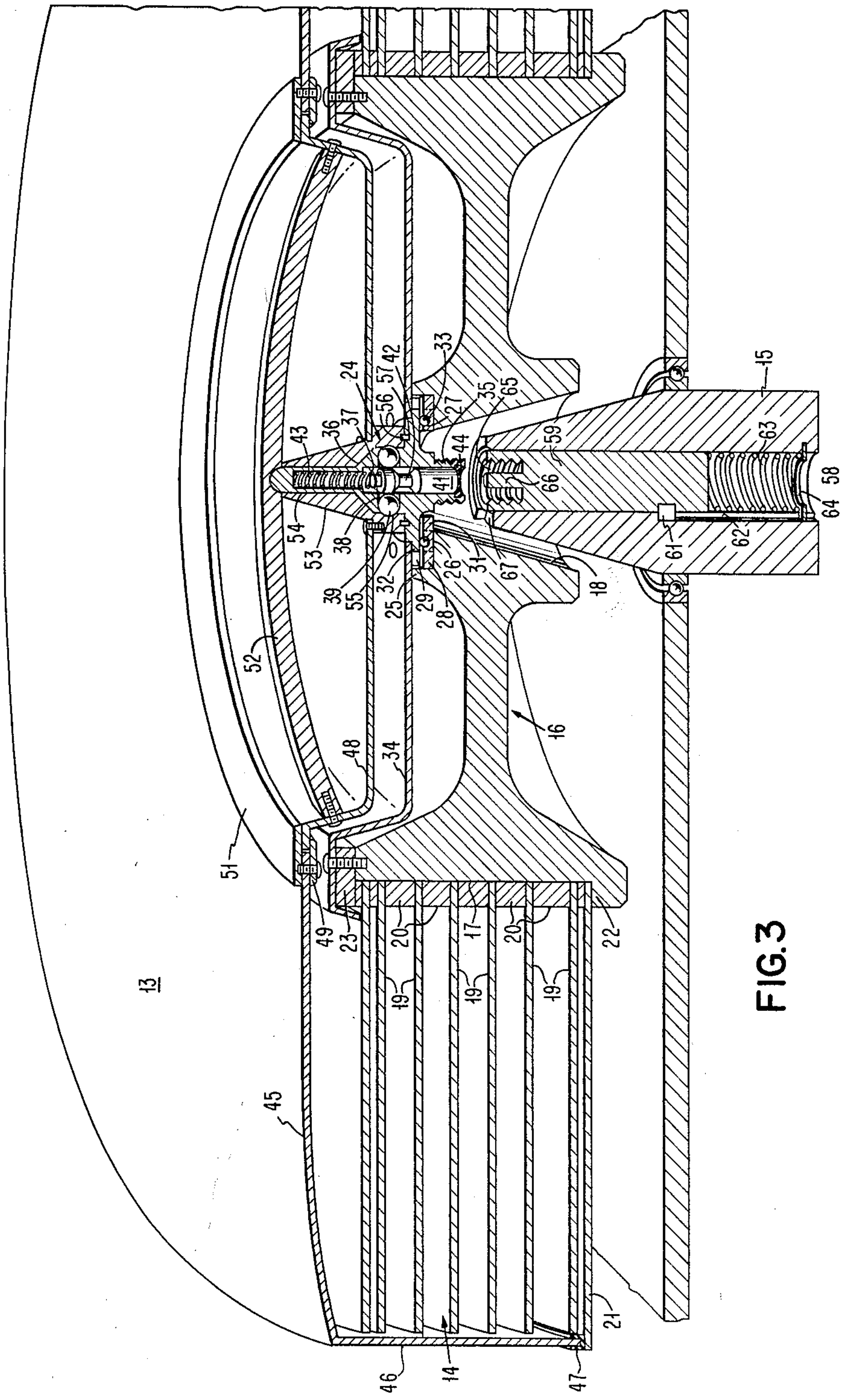
FIG. 3 is a sectional view in perspective, and at an enlarged scale, showing the construction of the dust cover, disk pack and locking assembly.

As shown in FIG. 3 the disk pack 14 includes a central support casting 16 which is provided with a cylindrical outer section 17 and a generally conical inner surface 18. A number of flat, circular recording disks 19 are mounted on the cylindrical section 17 in parallel, concentric fashion. A bottom protective disk 21, of slightly larger outside diameter than the recording disks, is positioned at the bottom of the disk pack, the individual disks being spaced slightly apart by means of annular spacers 20. The disks and spacers are clamped firmly in place on the cylindrical section between an annular stop 22 formed at the lower edge of the cylindrical section and a retaining cap 23 removably secured to the upper edge of the cylindrical section. A locking assembly housing 24 is rotatably mounted in the center of the disk support casting 16. The housing 24 is received within a central recess in the casting defined by a cylindrical flange 25 and a shoulder 26. A circular bearing race 27 (FIG. 4) is positioned on shoulder 26 and is keyed to flange 25 by means of ears 28 received in slots 29 in the flange. The race is also provided with a key 31 which extends radially inward beyond the conical surface 18. The housing includes a circular support section 32 which is supported on ball bearings 33 carried by race 27 and which is held in place by a lid 34 secured to the retaining cap 23. The locking assembly housing also includes an externally threaded sleeve 35 which extends below the support section and a stud 36 which protrudes above the support section. A central bore 37 is provided in sleeve 35 and stud 36. Two or more radially extending passages 38 communicate between the bore 37 and the external surface of the stud above the circular support section 32. A ball 39 is mounted in each such passage. A generally cylindrical lock pin 41 is provided with a reduced shank section 42 and is received within the bore 37. As shown, the lock pin is biased toward the open end of the bore 37 by means of a compression spring 43 and is retained within the bore by means of a retaining ring 44.

The dust cover 13 includes a generally circular top surface 45 and a cylindrical side section 46. A resilient dust seal 47 surrounds the lower edge of cylindrical section 46. A central well section 48 is rotatably supported at the inner edge of top section 45 between clamping rings 49 and 51. A handle 52 spans the well 48 and is secured thereto at its opposite extremities. A generally cylindrical cover support hub 53 is firmly secured at the center of the well 48. The hub 53 is provided with a central bore 54 which is dimensioned to receive the stud 36 with slight tolerance. A annular groove 55 is formed in the hub near the lower extremity of the bore 54. A plurality of wrench pins 56 are mounted in the lower surface of the support hub and are adapted to be received within recesses 57 formed in the upper surface of the circular support section 32 of the locking assembly housing.

The spindle 15 is in the form of a truncated cone and is provided with a central longitudinal bore 58. A cylindrical spindle locking member 59 is mounted in the bore 58 for axial movement thereof by means of radially extending key 61 received within slot 62. The spindle locking member 59 is spring loaded within the bore 58 by means of compression spring 63 which is held in place by ring 64. The upper end of the spindle locking member 59 is provided with an internally threaded annular bore 65 surrounding a cylindrical release pin 66. A radially extending slot 67 is provided in the upper surface of the spindle.

The operation of the present invention is illustrated in connection with FIGS. 1, 2 and 3 of the drawings. When the memory package is detached from the processing unit the dust cover is secured to the disk pack as shown in FIGS. 1 and 3. At such time the dust seal 47 bears against the protective bottom disk 21 to protect the disk pack from dust and dirt during storage. The dust cover, itself, is secured to the disk pack by means of a locking connection between the locking assembly housing 24 and the cover support hub 53. The stud 36 is received within bore 54 in the support hub and is locked therein by means of balls 39 extending into annular groove 55. The balls 39 are held in their extended position to lock stud 36 to the hub 53 by means of the full width of the locking pin 41. When the cover is in position on the disk pack the wrench pins 56 are received within recesses 57 in support section 32 and form a driving connection between the support hub and the locking assembly housing. When it is desired to attach the disk pack to the processing unit, the center of the disk pack is positioned over the drive spindle 15 as illustrated in FIG. 3. The memory package is then lowered vertically until the key 31 on the bearing race 27 is received within slot 67 in the spindle and the internal conical surface 18 of the support casing bears against the external conical surface of the spindle. At the same time the lower portion of the sleeve 35 bears against and depresses the spindle locking member 59 against the action of spring 63. At this time the disk support casting is firmly seated on the drive spindle, but is not locked thereto. To lock the disk pack to the spindle, the cover well 48 is rotated by means of handle 52. Rotational motion of the handle 52 is transmitted through the well 48, support hub 53, wrench pins 56, recesses 57 and support section 32 to the sleeve 35. Rotational motion of the sleeve then engages the external thread on the sleeve with the internal thread in the bore 65. As the lower portion of the sleeve 35 is screwed into bore 65, the release pin 66 bears against the lower surface of the locking pin 41. As the lower portion of sleeve 35 is progressively received within bore 65, locking pin 41 is forced upwardly against the action of spring 43 until the reduced shank section 42 is aligned with the radial passages 38. At this time balls 39 may move radially inwardly of the passages 38 and move out of engagement with annular groove 55. This allows the dust cover to be removed from the disk pack by merely lifting vertically as illustrated in FIG. 2.

To remove the disk pack from the processing unit, the dust cover is repositioned on the disk pack with the stud 36 received within bore 54 and with wrench pins 56 positioned in recesses 57. The handle 52 is then turned in the opposite direction, causing the sleeve 35 to be retracted from bore 65. As the locking assembly continues to rotate and the sleeve is withdrawn from the spindle locking member, the locking pin 41 is forced downwardly by the action of spring 43. Locking pin 41 then forces balls 39 radially outward in passages 38 until the balls again engage annular groove 55 and secure the locking assembly housing to the support hub. When the sleeve 35 is fully disengaged from the spindle locking member, the memory package may be lifted vertically and removed from the processing unit. Due to the spring loading of the spindle locking member the full weight of the disk pack is borne by the spindle itself rather than by the interlocking threads of the spindle and bore 65.

By means of the construction illustrated the memory package is protected for transportation and storage when it is detached from the processing unit, and the protective dust cover cannot be inadvertently removed from the disk pack. When the memory package is mounted on the processing unit it is precisely aligned with the drive spindle, so that the recording disks, and the tracks thereon, are accurately located relative to an access mechanism (not shown) mounted on the processing unit.

While the present invention has been illustrated in connection with a disk-type memory and has particular applicability to such, it is also applicable to any type of portable memory, e.g., drum, tape strip, wire, etc., in which the recording medium would be mounted on the cylindrical section of the support casting.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A compact, portable memory package for use with a memory processing unit which includes a memory drive means, comprising:
   - a generally cylindrical memory including means for achieving precise alignment with the memory drive means;
   - a dust cover for enclosing the memory; and
   - locking means carried by the memory for locking the memory to the drive means whenever the cover is removed from the memory and for automatically locking the cover to the memory when the memory package is separated from the processing unit.

2. A compact, portable memory package for use with a memory processing unit which includes a memory drive means, comprising:
   - a generally cylindrical memory;
   - a dust cover which serves as a storage receptacle for the memory;
   - locking means carried by the memory for selectively locking the memory to the drive means whenever the cover is removed from the memory or to the dust cover when the memory package is separated from the processing unit; and
   - means carried by the dust cover for engaging and disengaging the locking means with the memory drive means.

3. A compact, portable memory package for use with a memory processing unit which includes a memory drive means, comprising:
   - a disk pack including a plurality of spaced parallel recording disks and means for achieving precise alignment with the memory drive means;
   - a dust cover for the disk pack; and
   - locking means carried by the disk pack for selectively locking the disk pack to the drive means whenever the cover is removed from the memory and to the cover when the memory package is separated from the processing unit.

4. A compact, portable memory package for use with a memory processing unit which includes a memory drive means, comprising:
   - a disk pack including a plurality of spaced parallel recording disks and means for achieving precise alignment with the memory drive means;
   - a dust cover which serves as a storage receptacle for the disk pack;
   - locking means carried by the disk pack for selectively locking the disk pack to the drive means when the cover is removed from the disk pack or to the dust cover when the memory package is separated from the processing unit; and means carried by the dust cover for engaging and disengaging the locking means with the memory drive means.

5. A compact, portable memory package for use with a memory processing unit which includes a memory drive means, comprising:

a disk pack including a central support member and a plurality of recording disks mounted in spaced parallel relation to each other on the supporting member, and means for achieving precise alignment with the memory drive means;

a dust cover adapted to serve as a storage receptacle for the disk pack;

locking means carried by the support member for selectively locking the disk pack either to the memory drive means or to the dust cover; and means carried by the dust cover for engaging and disengaging the locking means with the memory drive means.

6. A compact, portable memory package for use with a memory processing unit which includes a memory drive means, comprising:

a disk pack having a central support member including means for achieving precise alignment with the memory drive means, a plurality of recording disks and a protective disk of larger diameter than the recording disks, the disks being mounted on the support member in spaced parallel fashion with the protective disk on the bottom;

a generally cylindrical dust cover adapted to surround the disk pack and bear against a surface of the protective disk;

locking means carried by the central support member for selectively locking the disk pack either to the memory drive means or to the dust cover; and means carried by the dust cover for engaging and disengaging the locking means with the memory drive means.

7. A compact, portable memory package for use with a memory processing unit which includes a memory drive means, comprising:

a disk pack including a central support member and a plurality of spaced recording disks mounted thereon;

a dust cover adapted to serve as a storage receptacle for the disk pack; and locking means carried by the support member, the locking means including a housing containing a first locking assembly adapted to engage the dust cover and a second locking assembly adapted to engage the memory drive means, the two locking assemblies being positioned adjacent each other and so arranged that the first assembly is automatically disengaged and engaged, respectively, when the second assembly is respectively engaged and disengaged.

8. A compact, portable memory package for use with a memory processing unit as defined in claim 7, including means carried by the dust cover for engaging and disengaging the second locking assembly with the memory drive means.

References Cited by the Examiner

UNITED STATES PATENTS

| | | | |
|---|---|---|---|
| 1,032,889 | 7/12 | Freund | 292—252 |
| 1,288,313 | 12/18 | Waibel | 312—284 |
| 1,864,466 | 6/32 | Peterson | 279—75 |
| 2,678,861 | 5/54 | Funk | 312—284 |
| 2,717,167 | 9/55 | Worth | 220—55.7 |
| 2,751,229 | 6/56 | Schultz | 279—30 |
| 2,758,458 | 8/56 | Carlson | 312—284 |
| 2,983,978 | 5/61 | Wilgus | 279—75 |

FOREIGN PATENTS

| | | |
|---|---|---|
| 717,056 | 10/54 | Great Britain. |

IRVING L. SRAGOW, *Primary Examiner.*